UNITED STATES PATENT OFFICE.

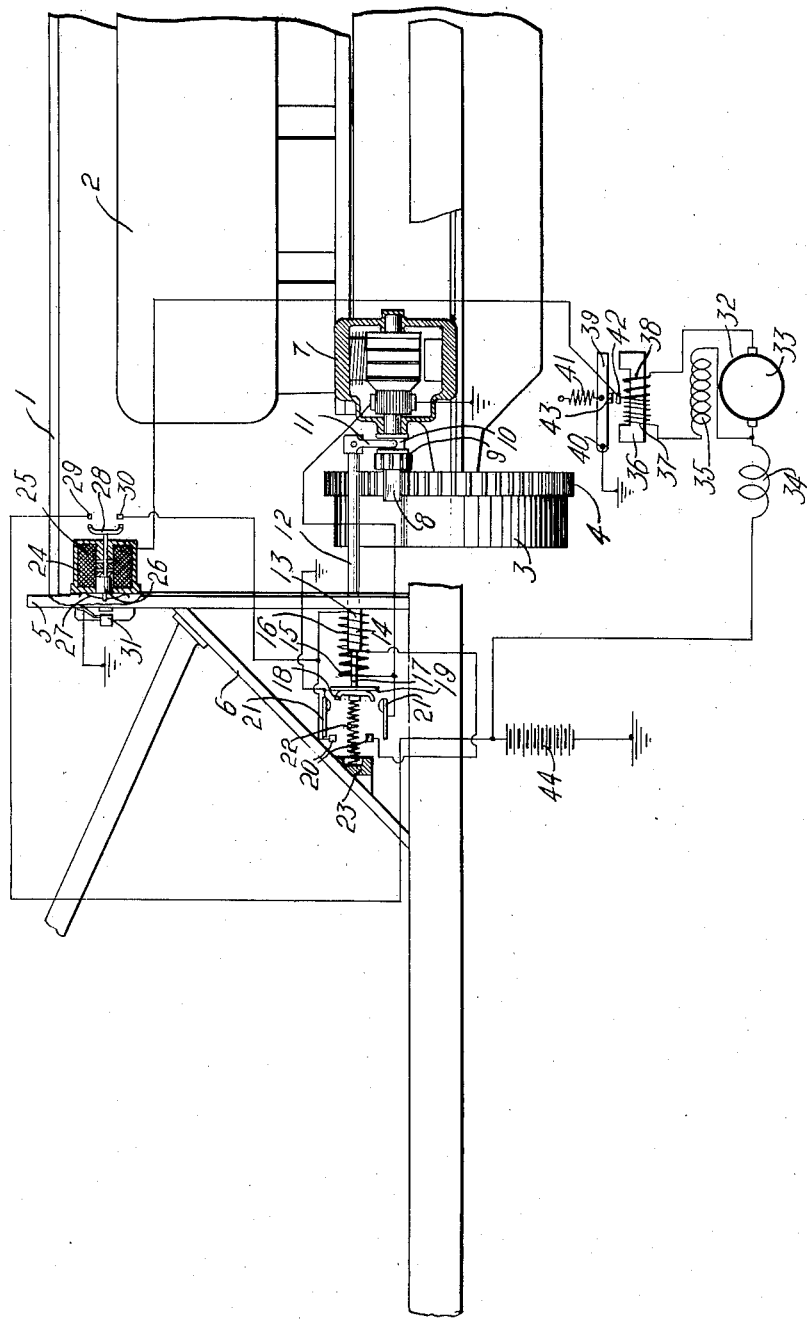

ALMON W. COPLEY, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING SYSTEM FOR AUTOMOBILES.

1,246,719.  Specification of Letters Patent.  Patented Nov. 13, 1917.

Application filed December 26, 1913. Serial No. 808,744.

*To all whom it may concern:*

Be it known that I, ALMON W. COPLEY, a citizen of the United States, and a resident of Pittsburgh, in the county of Allegheny and State of Pennsylvania, have invented a new and useful Improvement in Starting Systems for Automobiles, of which the following is a specification.

My invention relates to starting systems for automobiles, and it has for an object to provide a simple and effective means for automatically controlling the operative connection of a starting motor to the shaft of an internal combustion engine.

Self-starting devices, as heretofore constructed, usually comprise small high speed motors and reduction gear mechanisms for operatively connecting the motors to the shafts of internal combustion engines. A manually operated pedal or lever is customarily employed to shift a gear wheel into and out of mesh with a gear wheel on the engine shaft. Should the operator, by accident or neglect, fail to disconnect the motor from the engine immediately upon the starting of the latter under its power, the motor would be driven at an excessively high rate of speed.

I have provided a system which comprises electromagnetic means for shifting the connecting gear wheels into mesh by pressing an electric button. The motor circuit will be completed automatically upon the completion of the meshing of the gear wheels. When the engine starts under its own power, the gear wheels will be automatically disconnected and the motor circuit will be broken simultaneously.

The details of my invention will be described in connection with the accompanying drawing in which the single figure is a side view, partially in section and partially in elevation, of a portion of an automobile with my invention applied thereto, the electrical circuits and certain of the apparatus being illustrated diagrammatically.

An automobile 1, only a portion of which is shown, comprises the usual gas engine 2 having a fly wheel 3 that is provided with gear teeth 4. The dashboard and foot board of the automobile are indicated at 5 and 6, respectively. An electric motor 7 is attached, by any suitable means, to the engine or to the automobile chassis. The motor 7 is provided with an armature shaft 8 upon which a pinion 9 is mounted to slide into and out of mesh with the fly wheel gear teeth 4. The pinion 9 is provided with an integral grooved collar 10 to be engaged by a yoke member 11 that is fixed to a slidable shift rod 12.

The shift rod 12 extends through a suitable opening in the dash board 5 and is provided with an enlarged portion 13 that serves as the movable core member of an electromagnet 14. The electromagnet comprises a series coil 15 having a portion 16 of relatively fine wire which is adapted to be short-circuited, as will be later described. The rod 12 is also provided with a reduced portion 17 upon which are mounted movable contact members 18 and 19 which coact with fixed contact members 20 and contact clips 21, respectively. The several contact members 18, 19, 20 and 21 constitute the controlling switch for the motor 7. A spring 22 is interposed between the rear end of the shift rod 12 and a suitable bracket 23 on the foot board 6 to normally hold the rod 12 in its forward position, with the pinion 9 in its inoperative position.

An electromagnet 24, which is mounted on the dash board 5, comprises a coil 25 and a movable core member 26 that is normally retained in its outward position by a spring 27. A movable contact member 28, which is fixed to the core member 26, coacts with fixed contact members 29 and 30 to control the circuit of the coil 15. A push button switch 31 controls the circuit of the magnet coil 25 and, thereby, the position of the movable switch member 28.

A generator 32, the armature of which is indicated at 33, is provided with a series field winding 34 and a shunt field winding 35. The electrical connections of the generator are controlled by an automatic cut out which comprises a core member 36, coils 37 and 38, and an armature 39 having a pivotal support indicated at 40 and normally held upward by a spring 41. The coils 37 and 38 are connected at a common point to a contact member 42 that coacts with a contact member 43 mounted upon and electrically connected to the armature 39.

When it is desired to start the engine, the operator closes the push button switch 31 to close a circuit from the ungrounded terminal of a storage battery 44 through the series field winding 34, generator armature 33, coil 38, contact member 42, coil 25 and switch 31 to ground and back to the battery. The coil 25 is energized to draw the core member 26 forwardly and thus cause the switch member 28 to bridge the contact members 29 and 30. A circuit is thus completed from the ungrounded side of the battery 44 through the switch 28, coil 15 and motor armature to ground. The coil 15 is thus energized to shift the rod 12 and, thereby, the pinion 9 and the movable contact members 18 and 19. At the same time, the motor armature is rotated slowly owing to the relatively high resistance of the portion 16 of the coil 15 which is in circuit with it.

The contact member 19 first engages the contact clips 21 to temporarily short circuit the motor armature so that no torque will be applied to it while the pinion 9 is being meshed with the fly wheel gear teeth 4, the motor armature rotating slowly by reason of its inertia only. When the contact member 19 has passed the contact clips 21, the motor circuit is again established through the coil 15. At the end of the shifting movement, the pinion 9 is fully meshed with the gear teeth 4 and the contact member 18 bridges the contact members 20 to short circuit the high-resistance portion 16 of the coil 15. The running circuit of the motor is thus completed, the low-resistance portion of the coil 15 acting as a holding coil to retain the rod 12 in its shifted position. The motor then operates at a high speed to rotate the fly wheel through the reduction gear mechanism.

When the engine starts under its own power, the generator, which is operatively connected to the engine by any suitable mechanism (not shown), is operated at an increasing speed. The electromotive force of the generator opposes that of the battery and thus decreases the electromotive force applied to the magnet coil 25. When the effective electromotive force reaches a minimum that is determined by the strength of the spring 27, the switch member 28 is withdrawn to break the circuit of the coil 15 and the motor 7 and allow the spring 22 to return the shift rod 12 to its normal position. The pinion 9 is thus automatically disengaged from the fly wheel gear teeth 4 before the motor armature has attained a dangerous speed. The push button switch 31 is then ineffective to operate the magnetic switch 28 while the generator rotates above a predetermined speed.

As the generator speed increases, the voltage reaches a value at which the coils 37 and 38 are sufficiently energized to draw the armature 39 downwardly to connect the contact members 42 and 43. The charging circuit of the generator is thus completed from the positive terminal of the generator through the coil 38, contact members 42 and 43, armature 39 to ground, battery 44, and series field winding 34 to the negative terminal of the generator. The charging circuit will then remain closed as long as the generator voltage exceeds that of the battery.

When the generator voltage is less than that of the battery, the latter will tend to discharge back through the generator and, consequently, current will flow in the reverse direction through the series coil 38. The coils 37 and 38, which normally assist one another, are now opposed and, as a result, the armature 39 is released to break the charging circuit. The cut out 36 thus automatically controls the charging circuit and prevents the battery from discharging back through the generator except during the closure of the push button switch 31 in starting.

I claim as my invention:

1. In a starting mechanism, the combination with a gas engine, a motor, and means for operatively connecting the motor to the engine, of means comprising a coil having portions of different resistance values for controlling said connecting means.

2. In a starting mechanism, the combination with an engine, a motor, and means for operatively connecting said motor to said engine, of means for controlling said connecting means comprising a shiftable member, a coil having portions of different resistance values, and switch members carried by the shiftable member for controlling the circuits of said motor and said coil.

3. In a starting mechanism, the combination with a gas engine, a motor, and means comprising a shiftable member for operatively connecting said motor to said engine, of means for simultaneously shifting said member and controlling the circuit of said motor, said means comprising a coil having portions of different resistance values.

4. In a starting mechanism, the combination with a gas engine, a motor, and means comprising a shiftable member for operatively connecting said motor to said engine, of a coil having sections of different resistance values for controlling said shiftable member, and means for completing a circuit for said motor through said coil and then short-circuiting the section of said coil having the higher resistance.

5. In a starting mechanism, the combination with a gas engine, a motor, and means comprising a shiftable member for operatively connecting said motor to said engine, of a coil having sections of different resistance values for controlling said shiftable member, and means for simultaneously completing a circuit for said motor and short circuiting the section of said coil having the higher resistance.

6. In a starting mechanism, the combination with an engine, a motor, and gear mechanism for operatively connecting said motor to said engine, of a shift rod connected to one member of said gear mechanism, and a magnet coil comprising portions having different resistance values for controlling said shift rod.

7. In a starting mechanism, the combination with two gear wheels, one of which is shiftable into and out of mesh with the other, of a member connected to said shiftable gear wheel, an electromagnet comprising a coil comprising portions having different resistance values for controlling said member, and means comprising a switch operated by said member for controlling the electrical connections of said motor and said coil.

8. In a starting mechanism, the combination with two gear wheels, one of which is shiftable into and out of mesh with the other, of a member connected to said shiftable gear wheel, an electromagnet for controlling said member and comprising a coil having two sections of different resistance values, and means for short circuiting the section of higher resistance when the gear wheels are in mesh.

9. In a starting mechanism, the combination with an engine, a motor, and means for operatively connecting said motor to said engine, of means comprising a coil for controlling said connecting means, and means for shunting a portion of said coil when the motor is operatively connected to said engine.

10. In a starting mechanism, the combination with an engine, a motor, and means for operatively connecting said motor to said engine, of an electrical circuit comprising a coil for simultaneously controlling said connecting means and producing a relatively slow rotation of said motor, and means for shunting at least a portion of said coil only when said connecting means are in operative relation.

In testimony whereof, I have hereunto subscribed my name this 19th day of Dec. 1913.

ALMON W. COPLEY.

Witnesses:
HARRY T. GEORGE,
B. B. HINES.